United States Patent [19]

Tsutaki et al.

[11] Patent Number: 5,022,140
[45] Date of Patent: Jun. 11, 1991

[54] METHOD OF MANUFACTURING MAGNETIC HEAD

[75] Inventors: Shoji Tsutaki; Kazuyoshi Fuse; Toshihiko Ohta, all of Yokohama, Japan

[73] Assignee: Kabushiki Kaisha Toshiba, Kawasaki, Japan

[21] Appl. No.: 490,407

[22] Filed: Mar. 8, 1990

[30] Foreign Application Priority Data

Mar. 10, 1989 [JP] Japan .................................. 1-59409
Sep. 20, 1989 [JP] Japan .................................. 1-242026

[51] Int. Cl.$^5$ .............................................. G11B 5/42
[52] U.S. Cl. ...................... 29/603; 360/121; 360/122; 360/127
[58] Field of Search ................ 29/603; 360/119-121, 360/122, 125-127

[56] References Cited

U.S. PATENT DOCUMENTS 4,794,483 12/1988 Naitoh et al. .................. 360/120
4,890,378 1/1990 Suzuki et al. .................. 29/603

FOREIGN PATENT DOCUMENTS 299480 1/1989 European Pat. Off. .
3279404 11/1988 Japan .

Primary Examiner—Carl E. Hall
Attorney, Agent, or Firm—Cushman, Darby & Cushman

[57] ABSTRACT

In a magnetic head a metal magnetic layer and a non-magnetic layer are sequentially formed on a pair of magnetic cores in which track widths are formed by a predetermined pitch. The metal magnetic layer and the non-magnetic layer formed outside the track widths are removed while leaving the track widths formed in said magnetic cores, thereby forming a regulation groove. The track widths of one magnetic core from which the metal magnetic layer and the non-magnetic layer are removed are caused to oppose those of the other magnetic core. Glass as an adhesive is filled in the regulation groove and melted to bond the magnetic cores so that a gap having the metal magnetic layer is formed. The pair of magnetic cores bonded to form the gap therebetween are cut by a predetermined pitch to form a magnetic head.

18 Claims, 8 Drawing Sheets

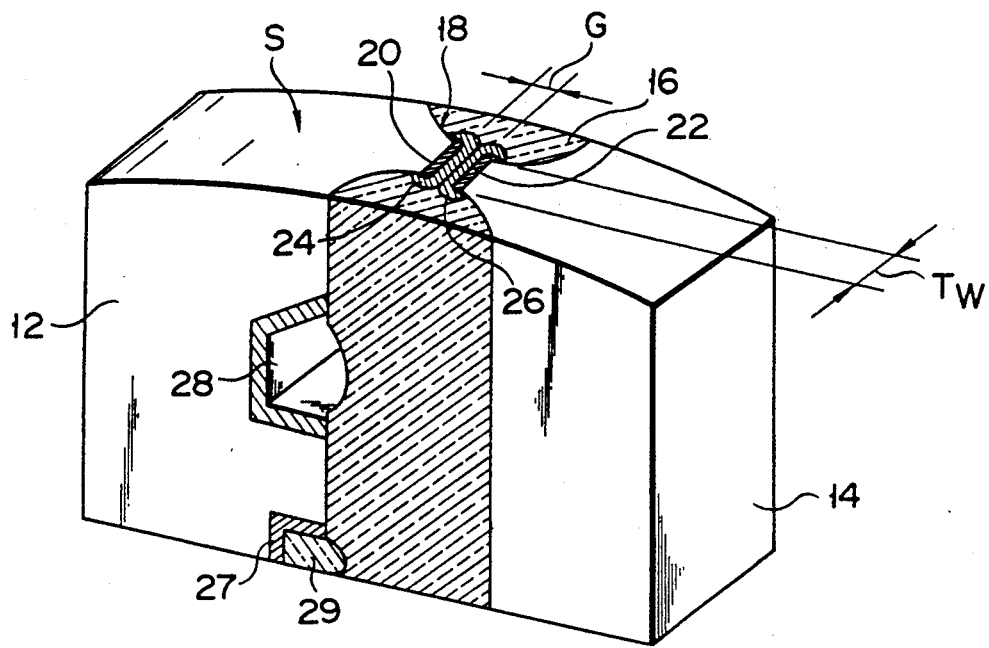
F I G. 1
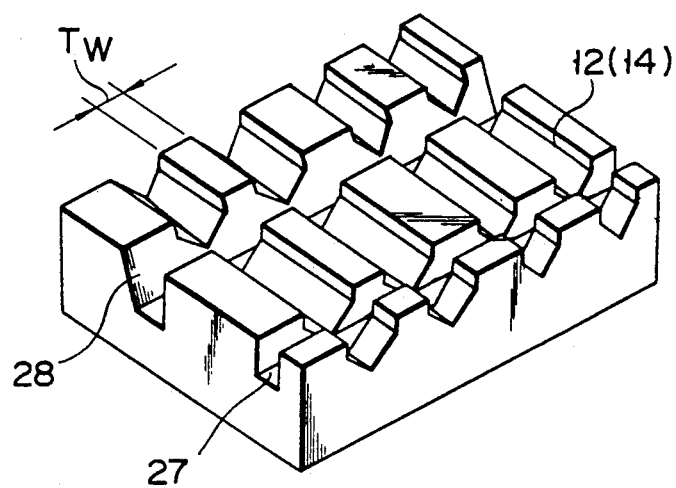
F I G. 2A
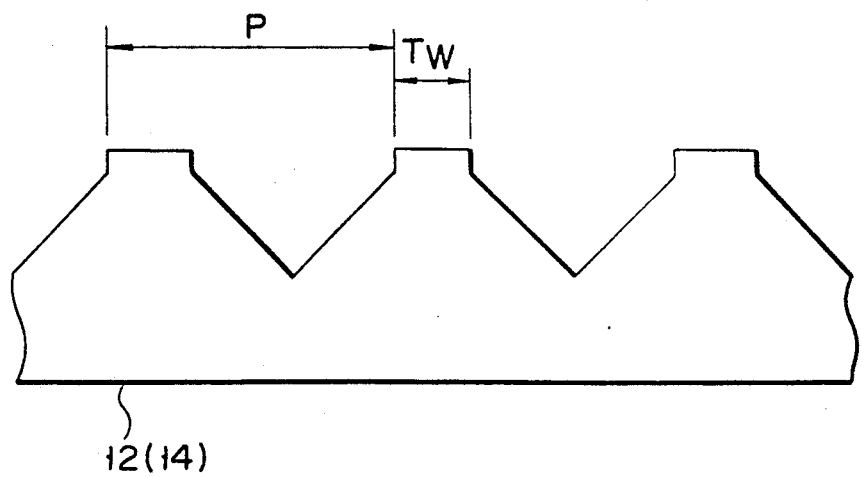
F I G. 2B

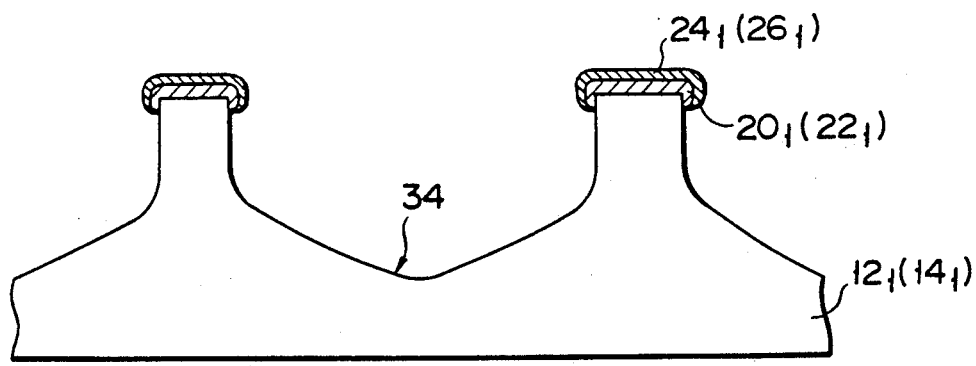
F I G. 3D
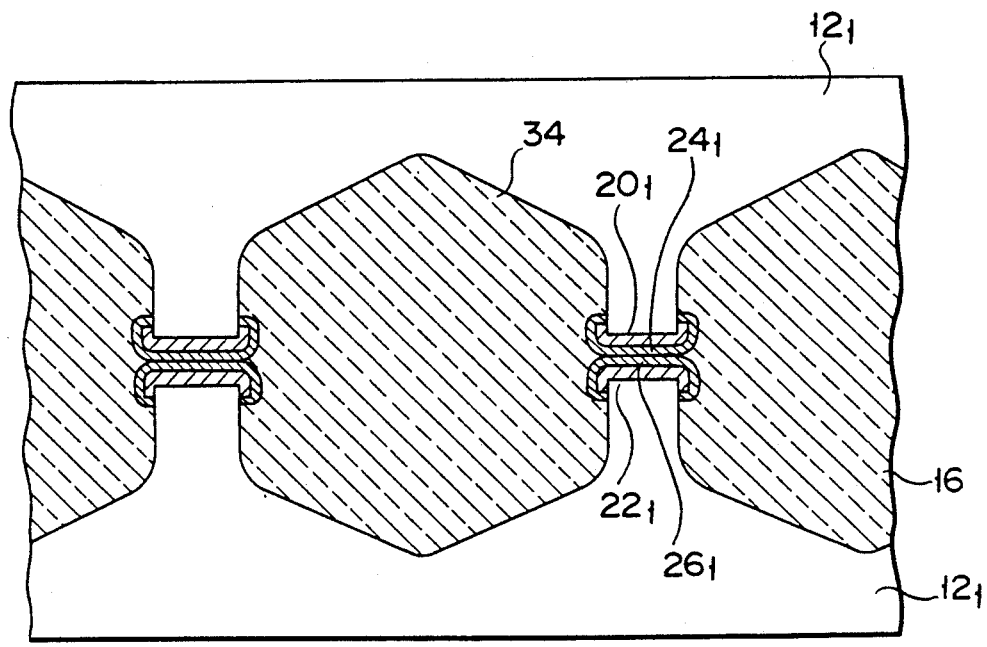
F I G. 3E
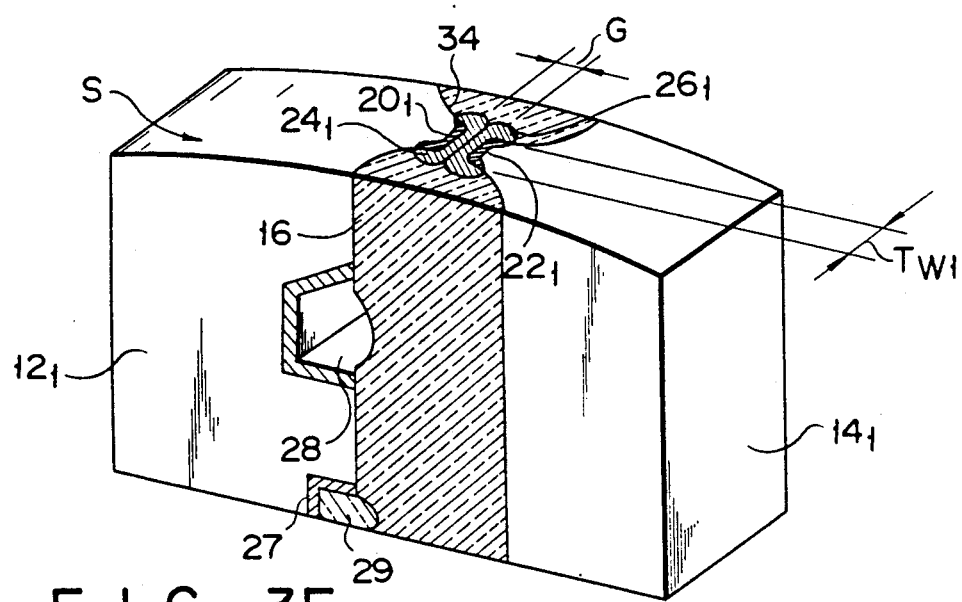
F I G. 3F

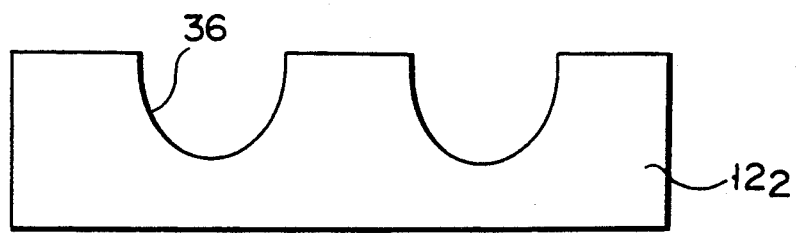
F I G. 4A
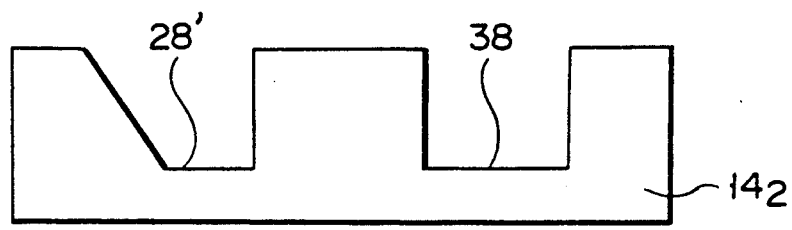
F I G. 4B
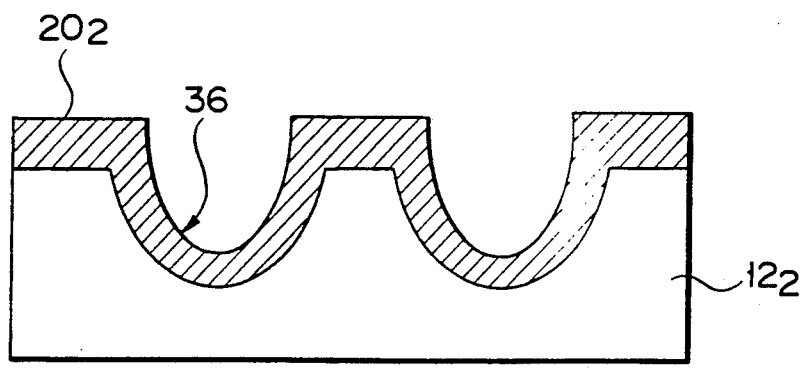
F I G. 4C

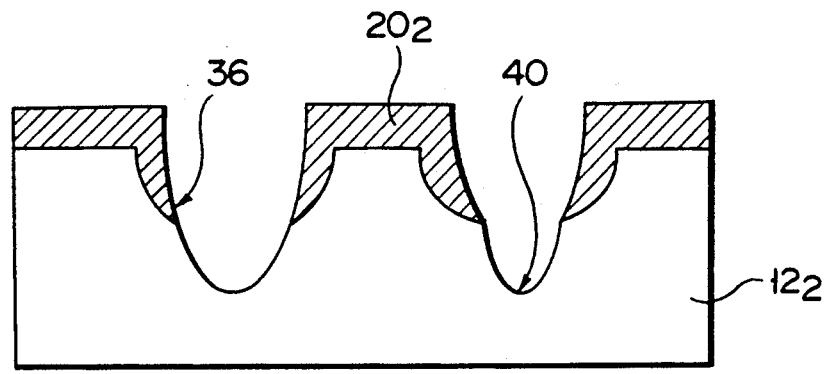
F I G. 4D
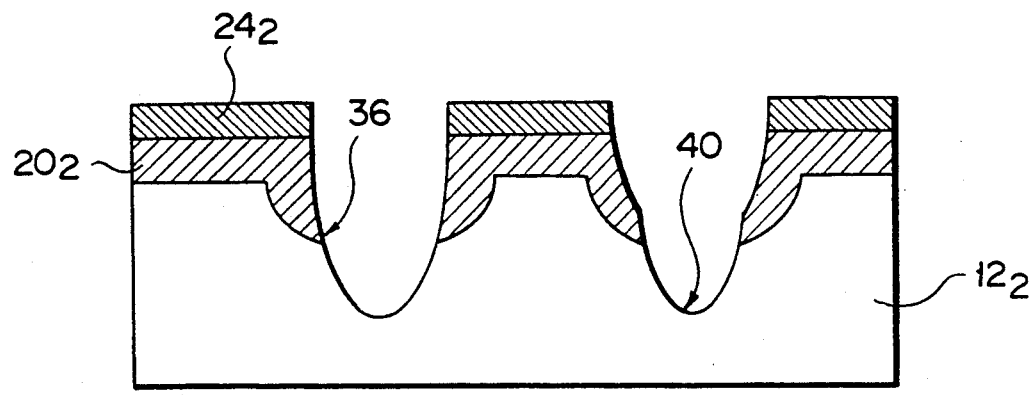
F I G. 4E
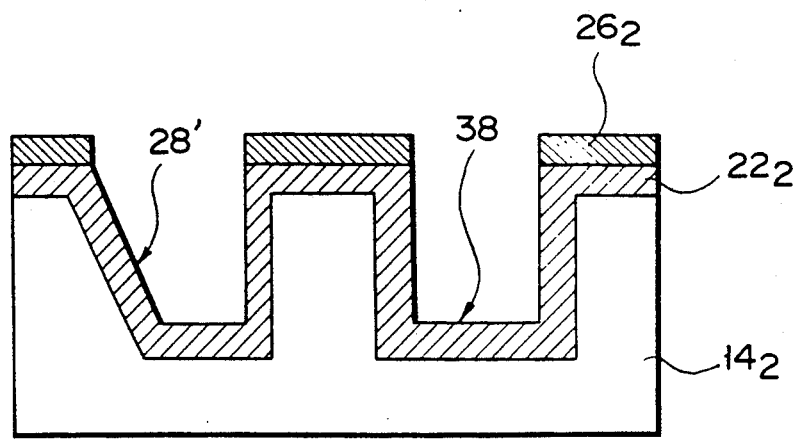
F I G. 4F

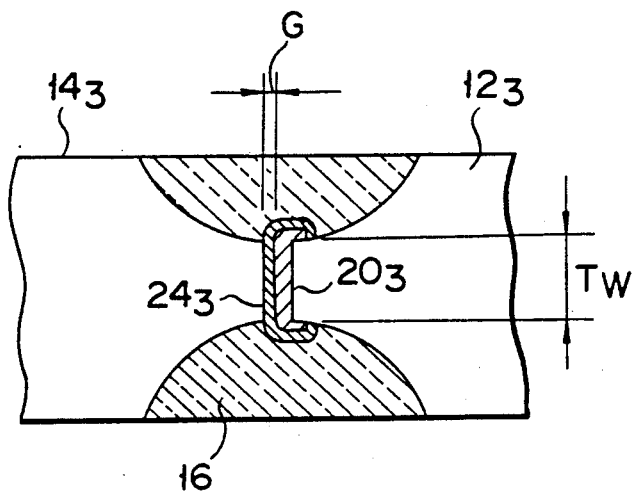
F I G. 5
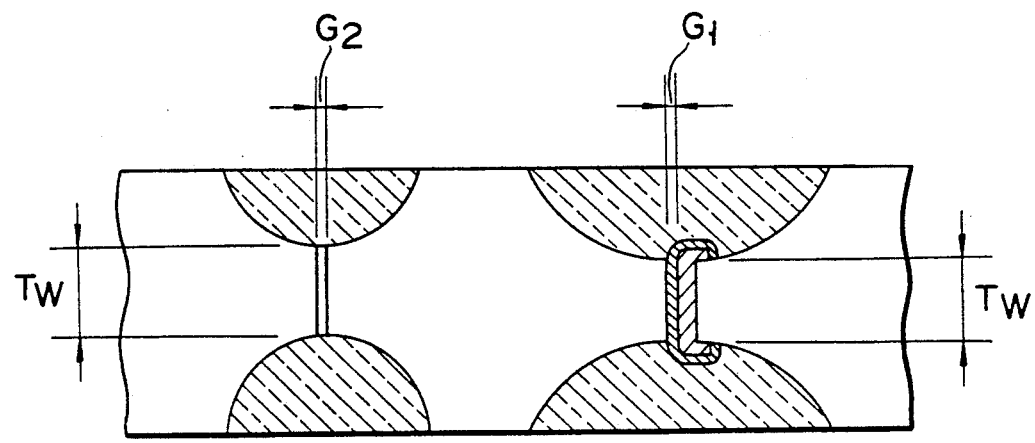
F I G. 6

METHOD OF MANUFACTURING MAGNETIC HEAD

BACKGROUND OF THE INVENTION

1. Field of the Invention

The present invention relates to a method of manufacturing a magnetic head for recording/reproducing data in/from a magnetic recording medium and, more particularly, to a method of manufacturing a magnetic head in which at least parts of a pair of magnetic cores are brought into contact with an adhesive.

2. Description of the Related Art

Various types of magnetic head for use in, e.g., a video tape recorder, a floppy disk apparatus, and a hard disk apparatus have been conventionally developed. As a magnetic tape having a high coercive force and a high residual flux density corresponding to an increased density of a recording medium, a head called an MIG (Metal In Gap) head having a high saturated flux density and a low residual flux density has been developed. This MIG head is obtained by sandwiching a gap formed between magnetic cores consisting of, e.g., ferrite by metal magnetic layers consisting of, e.g., Sendust or an amorphous metal magnetic material.

In such a conventional magnetic head, opposing core main bodies are formed of a pair of magnetic cores consisting of, e.g., ferrite, and a gap formed of a non-magnetic layer consisting of, e.g., $SiO_2$ is sandwiched by metal magnetic layers between the magnetic cores. In this magnetic head, track widths are formed at a predetermined pitch on each magnetic core, and regulation grooves are formed between the track widths. The metal magnetic layer having a thickness of, e.g., 4 to 8 $\mu m$ is formed on the surface opposing the track widths by sputtering, and the non-magnetic layer having a thickness of about 0.2 to 0.5 $\mu m$ is similarly formed on the metal magnetic layer by sputtering. The magnetic cores each having the metal magnetic layer and the non-magnetic layer are fused and bonded with each other by an adhesive such as glass so that the surfaces opposing the track widths oppose each other. The bonded magnetic cores are cut by the predetermined pitch, and a portion to serve as a tape contact surface is polished, thereby forming a magnetic head.

In the case of a magnetic head consisting of ferrite (to be referred to as a ferrite head hereinafter), if a predetermined stress remains in ferrite in a chip, the permeability of the core in a magnetic flux flowing direction is increased although the degree of increase depends on the composition of ferrite. As a result, reproducing efficiency of the magnetic head is significantly increased.

Although the MIG head has good recording performance, its reproduction efficiency is lower than that of the ferrite head. That is, a reproduction output obtained by the ferrite head is higher than that obtained by the MIG head. Therefore, in order to obtain a better MIG head, it is important to increase the permeability.

In order to increase the permeability, however, if a suitable difference is given between thermal expansion coefficients of the adhesive (glass) and the magnetic core (ferrite), the following problem is posed. That is, in the MIG head, the metal magnetic layer is formed between the adhesive and the magnetic core. For this reason, a stress caused by a difference between the thermal expansion coefficients of the adhesive and the magnetic core is not transmitted to the magnetic core. Therefore, the metal magnetic layer tends to deform, or the magnetic core and the metal magnetic layer are easily peeled at their interface. In addition, since the metal magnetic layer is present between the adhesives for bonding the opposing magnetic cores, a similar problem is posed in terms of bonding strength of the adhesive for bonding the magnetic cores.

When the magnetic core and the metal magnetic layer are peeled at their interface, a so-called pseudo gap is undesirably produced due to peeling between the magnetic core and the metal magnetic layer in a recording medium sliding portion corresponding to the track widths. Unlike frequency characteristics obtained by a normal gap, an output obtained by the pseudo gap degrades head characteristics. Therefore, it is difficult to obtain desired head characteristics.

SUMMARY OF THE INVENTION

It is, therefore, an object of the present invention to provide a method of manufacturing a magnetic head having a simple arrangement, a high permeability, high recording/reproducing output efficiency, and highly precise head characteristics.

According to an aspect of the present invention, there is provided a method of manufacturing a magnetic head comprising the steps of: sequentially forming a metal magnetic layer and a non-magnetic layer on at least one of a pair of core means in which predetermined track widths are to be formed by a predetermined pitch; removing at least the non-magnetic layer formed outside the track widths while leaving the track widths formed in one of the magnetic core means; bonding the magnetic core means such that the track widths of one magnetic core means from which the metal magnetic layer and the non-magnetic layer are removed and the other magnetic core means oppose each other, and forming a gap having the metal magnetic layer at least one surface thereof; and cutting the pair of magnetic core means bonded to form the gap therebetween by a predetermined pitch.

According to another aspect of the present invention, there is provided a method of manufacturing a magnetic head comprising the steps of: forming a plurality of pairs of grooves for regulating track widths in at least one of a pair of magnetic core means; sequentially forming a metal magnetic layer and a non-magnetic layer on the magnetic core means in which the plurality of pairs of grooves are formed; removing a portion between a pair of adjacent grooves while leaving the track widths of one of the magnetic core means, and forming track widths corresponding to the track widths of the one magnetic core means in the other magnetic core means; bonding one magnetic core means from which portions between the plurality of pairs of grooves are removed to the other magnetic core means so that the track widths oppose each other, thereby forming a gap sandwiched between the metal magnetic layers; and cutting the pair of magnetic core means between which the gap is formed by a predetermined pitch.

According to still another aspect of the present invention, there is provided a method of manufacturing a magnetic head comprising the steps of: forming a metal magnetic layer on at least one of a pair of magnetic core means in which predetermined track widths are formed by a predetermined pitch; removing at least the metal magnetic layer formed outside the track widths while leaving the track widths formed in on of the magnetic core means; forming a non-magnetic layer on the track widths on which the metal magnetic layer is formed; bonding the magnetic core means such that the track widths of one magnetic core means on which the metal magnetic layer and the non-magnetic layer are formed and the other magnetic core means oppose each other, and forming a gap having the metal magnetic layer at least at one side thereof; and cutting the pair of magnetic core means bonded to form the gap therebetween by a predetermined pitch.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrates presently preferred embodiments of the invention and, together with the general description given above and the detailed description of the preferred embodiments given below, serve to explain the principles of the invention.

FIG. 1 is a perspective view showing an outer appearance of a magnetic head obtained by a method of manufacturing a magnetic head according to an embodiment of the present invention;

FIGS. 2A through 2E are views showing manufacturing process for explaining the method of manufacturing the magnetic head shown in FIG. 1;

FIGS. 3A through 3F are views showing manufacturing process for explaining a method of manufacturing a magnetic head according to the second embodiment of the present invention;

FIGS. 4A through 4H are views showing manufacturing steps for explaining a method of manufacturing a magnetic head according to the third embodiment of the present invention;

FIG. 5 is a view showing a main part of a magnetic head according to the fourth embodiment of the present invention; and, FIG. 6 is a view showing a main part of a magnetic head according to the fifth embodiment of the present invention.

DETAILED DESCRIPTION OF THE PREFERRED EMBODIMENTS

Figure 2C:
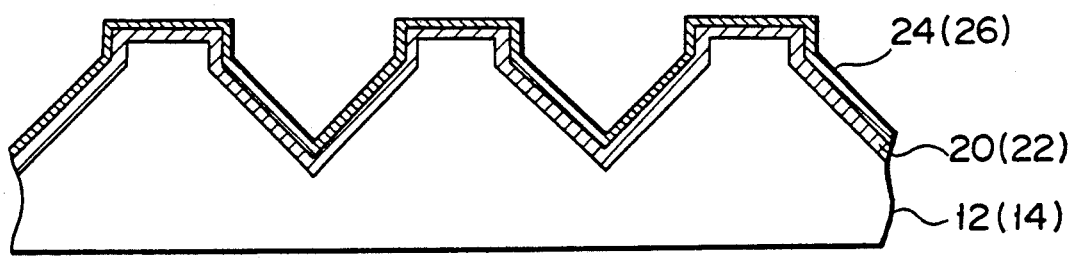

Preferred embodiments of the present invention will be described in detail below with reference to the accompanying drawings.

FIG. 1 shows a magnetic head according to the first embodiment of the present invention. Referring to FIG. 1, reference numerals 12 and 14 denote a pair of magnetic cores comprising, e.g., ferrite. Track widths $T_W$ are formed on substantially central portions of the magnetic cores in correspondence with each other. Regulation grooves 18 are formed in both sides to cause the magnetic cores 12 and 14 to oppose each other. An adhesive 16 such as glass is filled in the regulation groove 18. Metal magnetic layers 20 and 22 consisting of, e.g., Sendust and having a thickness of about 4 to 8 $\mu$m and non-magnetic layers 24 and 26 comprising, e.g., $SiO_2$ and having a thickness (about 0.24 to 0.5 $\mu$m) corresponding to a gap G are sequentially stacked on the opposing surfaces of the magnetic cores 12 and 14 so as to cover the end portions of the track widths $T_W$ formed on the opposing surfaces. The gap G is formed when the non-magnetic layers 24 and 26 oppose and are bonded to each other by the adhesive 16 and sandwiched between the metal magnetic layers 20 and 22.

With the above arrangement, portions of the magnetic cores 12 and 14 except for the metal magnetic layers 20 and 22 and the non-magnetic layers 24 and 26 are directly bonded to each other by the adhesive 16, thereby maintaining a sufficient bonded area. As a result, the magnetic cores 12 and 14 and the metal magnetic layers 20 and 22 are bonded to each other by adhesion strength of the adhesive 16 for bonding the portions except for the metal magnetic layers 20 and 22 and the non-magnetic layers 24 and 26 of the magnetic cores 12 and 14. A portion to serve as a tape sliding surface S (to be described later) is polished to be a curved surface.

A reinforcing groove 27 and winding groove 28 is formed in that surface of one magnetic core (in this case, the core 12) which opposes the other magnetic core (in this case, the core 14). The groove 27 is filled with reinforcing glass 29. The groove 28 receives a coil (not shown).

A method of manufacturing the magnetic core as shown in FIG. 1 will be described below with reference to FIGS. 2A through 2E. Note that in FIGS. 2A through 2D, only the magnetic core 12 and the reinforcing groove 27 are illustrated since the magnetic core 14 has the same structure except that the winding groove 28 is not formed, and corresponding reference numerals are shown in parentheses.

First, as shown in FIGS. 2A and 2B, the winding groove 28 is formed in one of the magnetic cores 12 and 14 (in this case, the core 12) comprising, e.g., ferrite. Thereafter, a plurality of track widths are formed by a predetermined pitch P on the magnetic core 12 (14).

As shown in FIG. 2C, the metal magnetic layer 20 (22) consisting of, e.g., Sendust is formed by sputtering to have a thickness of about 4 to 8 $\mu$m on an opposing surface of the core 12 (14) having the track widths $T_W$. The non-magnetic layer 24 (26) consisting of, e.g., $SiO_2$ is formed on the metal magnetic layer 20 (22) by sputtering.

Figure 2D:
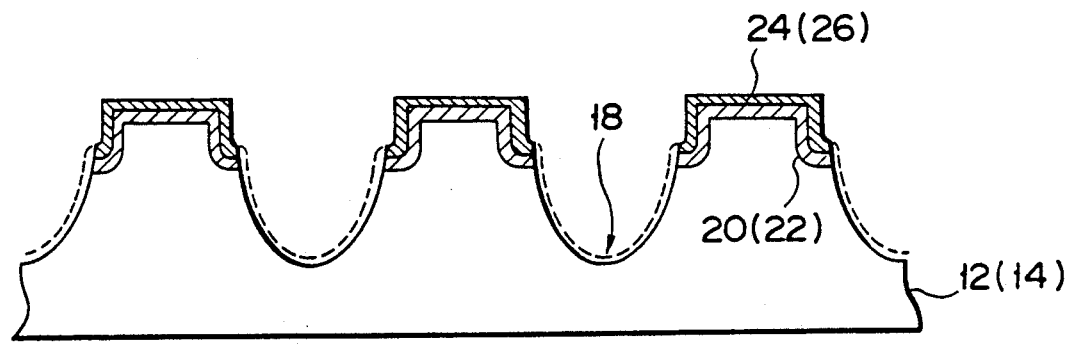

As shown in FIG. 2D, a part of the magnetic core 12 (14) including the layers 20 (22) and 24 (26) at both the sides of the track widths $T_W$ is removed to form the regulation grooves 18 so that the metal magnetic layer 20 (22) and the non-magnetic layer 24 (26) cover both the ends of each track width $T_W$ of the magnetic core 12 (14). In this case, the layers 20 (22) and 24 (26) and the core 12 (14) are removed by a method in which a portion to remain is masked and the metal magnetic layer 20 (22) at only a bottom portion of the regulation groove 18 is removed by etching, a method in which a grinding wheel having a width smaller than that of the width of the regulation groove 18 is used to cut and remove the metal magnetic layer 20 (22) formed on the wall surface of the regulation groove 18, or the like. The layer 20 (22) must be removed from the groove 18, but the layer 24 (26) can be left in the groove 18.

Figure 2E:
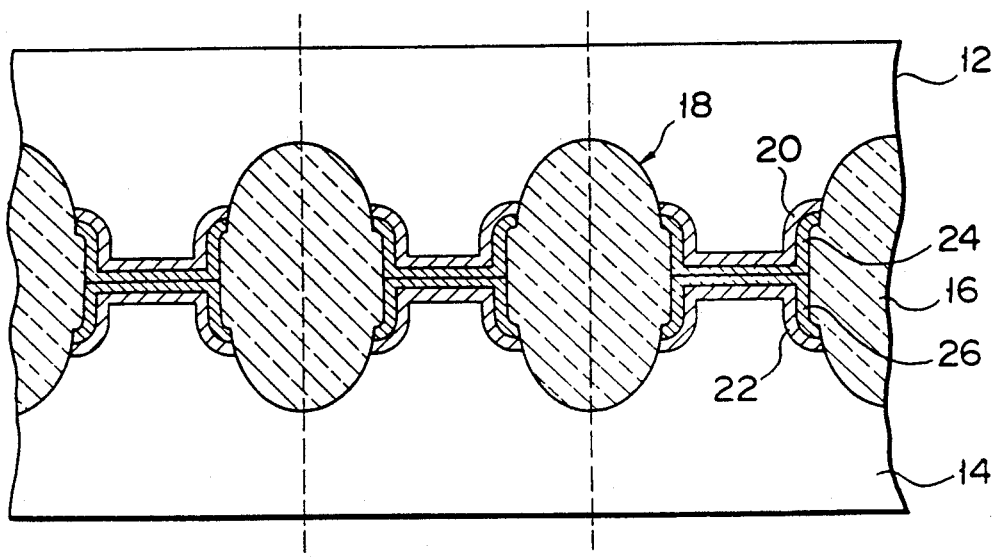

As shown in FIG. 2E, the magnetic core 14 formed in the same manner as the magnetic core 12 is brought into contact with the magnetic core 12 so that the track widths $T_W$ of the two cores oppose each other. The adhesive 16 is filled in the regulation grooves 18 and fused to bond the opposing cores 12 and 14. Thereafter, the resultant structure is cut as indicated by broken lines in FIG. 2E, thereby forming the magnetic head as shown in FIG. 1.

In the above magnetic head, the metal magnetic layers 20 and 22 and the non-magnetic layers 24 and 26 are formed to cover both the ends of the track widths $T_W$ of the magnetic cores 12 and 14. Therefore, when the magnetic cores 12 and 14 are bonded to each other, the portion except for the metal magnetic layers 20 and 22 covering both the ends of the track widths $T_W$ are directly bonded to each other, thereby maintaining a sufficient bonding area of the adhesive 16. Therefore, the adhesive strength between the magnetic cores 12 and 14 and the metal magnetic layers 20 and 22 is increased by the adhesive force of the adhesive 16. Since strong adhesion is realized, peeling between the magnetic cores 12 and 14 and the metal magnetic layers 20 and 22 which causes a pseudo gap in a conventional structure can be prevented, thereby maintaining head characteristics having precision as high as possible.

As described above, in the method of manufacturing a magnetic head according to the first embodiment, the track widths $T_W$ are formed on the magnetic cores 12 and 14, and the metal magnetic layers 20 and 22 and the non-magnetic layers 24 and 26 are sequentially formed. Thereafter, the metal magnetic layers 20 and 22 and the non-magnetic layers 24 and 26 at both the sides of each track width $T_W$ are removed to form the track width $T_W$ having the ends covered with the layers 20, 22, 24 and 26. According to this structure, since a large adhesion area can be obtained between the magnetic cores 12 and 14 and the adhesive 16 without adversely affecting formation of the track widths $T_W$, peeling of the metal magnetic layers 20 and 22 can be prevented while simplicity of the manufacture is maintained.

Note that in the above embodiment, the metal magnetic layers 20 and 22 and the non-magnetic layers 24 and 26 for covering the track widths $T_W$ of the magnetic cores 12 and 14 to both the ends thereof are formed by forming the regulation grooves 18 for removing the metal magnetic layers 10 and 22 and the non-magnetic layers 24 and 26 at both the ends of the track widths $T_W$. These layers, however, need not be manufactured by the above method but can be formed as follows.

FIGS. 3A through 3F show the second embodiment of the present invention. In FIGS. 3A through 3D, only one magnetic core is shown, and the other magnetic core is omitted and corresponding reference numerals are shown in parentheses since the other magnetic core is the same as one magnetic core except that no winding groove and reinforcing groove are formed.

Figure 3A:
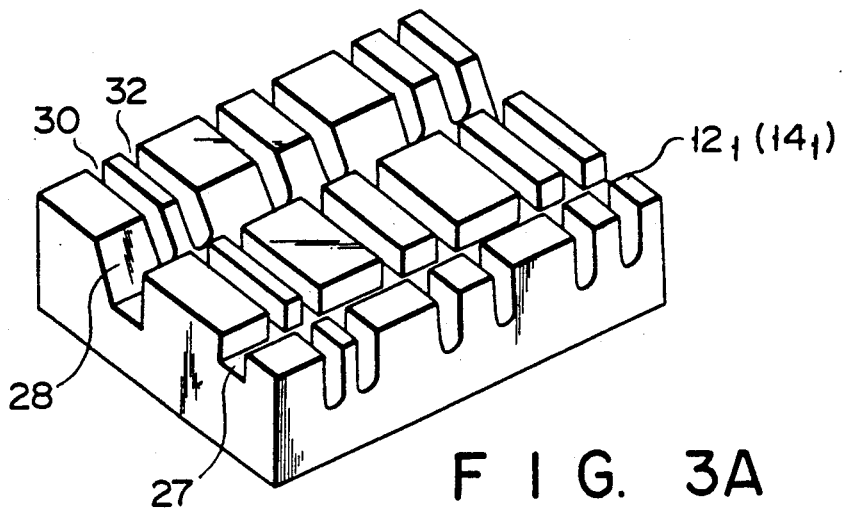
Figure 3B:
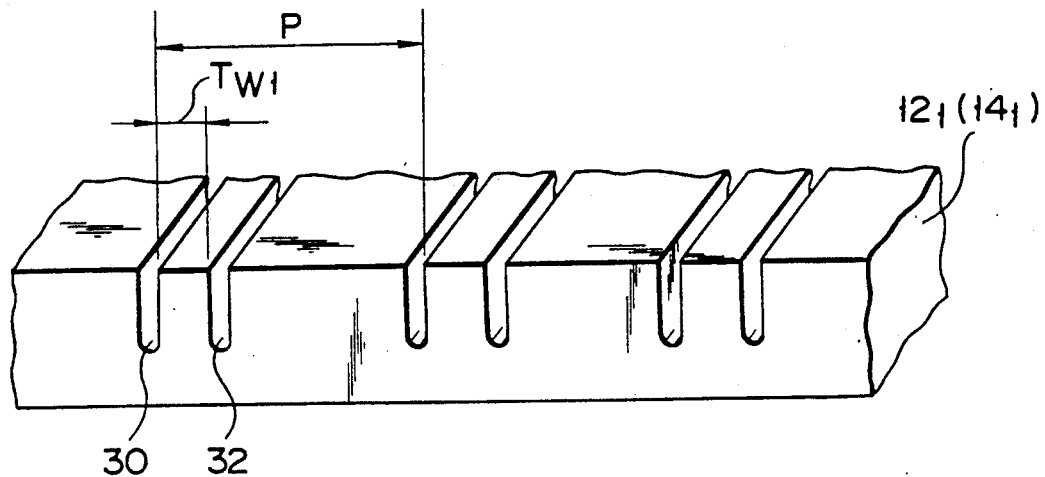

That is, as shown in FIGS. 3A and 3B, in order to form track widths $T_{W1}$ having a width of, e.g., 20 μm, a plurality of pairs of preliminary regulation grooves 30 and 32 for regulating the track widths $T_{W1}$ are formed by a pitch P of about 300 μm in one of a pair of magnetic cores (in this case a magnetic core $12_1$) consisting of ferrite. A reinforcing groove 27 and a winding groove 28 are formed in one of the magnetic cores.

Figure 3C:
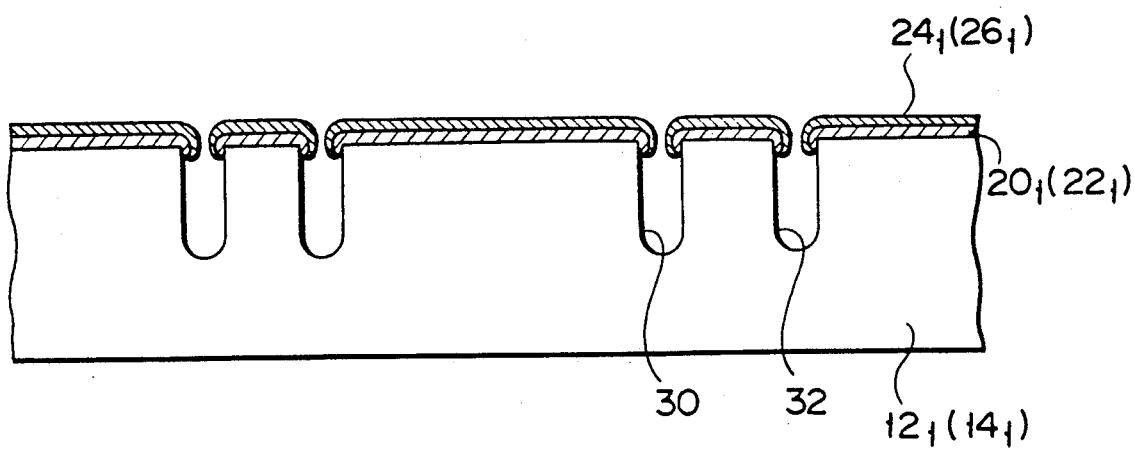

As shown in FIG. 3C, about 4 to 8 μm of a metal magnetic layer $20_1$ ($22_1$) consisting of, e.g., Sendust is formed on the surface including the grooves 30 and 32 by sputtering or the like. A non-magnetic layer $24_1$ ($26_1$) consisting of, e.g., $SiO_2$ is formed to have a thickness (about 0.24 to 0.5 μm) corresponding to a gap G by sputtering or the like. The width of the grooves 30 and 32 is formed by a grinding wheel, laser, etching, or the like so that the width becomes twice to ten times the layer thickness of the metal magnetic layer $20_1$ ($22_1$) and the non-magnetic layer $24_1$ ($26_1$). The metal magnetic layer $20_1$ ($22_1$) and the non-magnetic layer $24_1$ ($26_1$) coated on the magnetic core $12_1$ ($14_1$) are formed inside each groove near its opening.

As shown in FIG. 3D, a portion between the pair of preliminary regulation grooves 30 and 32 for regulating the track width $T_{W1}$ and another pair of preliminary regulation grooves 30 and 32 formed in the magnetic core $12_1$ ($14_1$) and adjacent to the above pair of grooves 30 and 32 is removed to form a regulation groove 34. In this manner, the track width $T_{W1}$ covered to both the ends thereof with the metal magnetic layer $20_1$ ($22_1$) and the non-magnetic layer $24_1$ ($26_1$) is formed.

The magnetic cores $12_1$ and $14_1$ in which the regulation groove 34 is formed by removing the portion between the pair of preliminary regulation grooves 30 and 32 and another pair of regulation grooves 30 and 32 adjacent to the above pair of grooves 30 and 32 are bonded as shown in FIG. 3E. That is, the track widths $T_W$ of the magnetic cores $12_1$ and $14_1$ oppose and are bonded to each other by using an adhesive 16.

After the gap G sandwiched by the metal magnetic layers $20_1$ and $22_1$ is formed, the resultant structure is cut as indicated by a broken line. A portion to serve as a tape sliding surface S is polished to form a magnetic head as shown in FIG. 3F.

In the magnetic head manufacturing method as described above, a plurality of pairs of preliminary regulation grooves 30 and 32 for regulating the track widths $T_W$ of the magnetic cores $12_1$ and $14_1$ are formed, and the metal magnetic layers $20_1$ and $22_1$ and the non-magnetic layers $24_1$ and $26_1$ are sequentially formed on the surface in which the pair of grooves 30 and 32 are formed. Thereafter, the portion between the pair of grooves 30 and 32 and another pair of preliminary regulation grooves 30 and 32 adjacent to the above pair of grooves 30 and 32 is removed to form the regulating groove 34, and the track width $T_W$ covered to both the ends thereof with the metal magnetic layers $20_1$ and $22_1$ and the non-magnetic layers $24_1$ and $26_1$ is formed. As a result, a magnetic head having a large adhesion area between the magnetic cores $12_1$ and $14_1$ and the adhesive 16 can be simply formed without adversely affecting formation of the track width $T_W$.

FIGS. 4A through 4H show the third embodiment of the present invention. In FIGS. 4C through 4G, only one magnetic core is shown, and the other magnetic core is omitted and corresponding reference numerals are shown in parentheses since the other magnetic core is the same as one magnetic core except that no winding groove and no bonding groove are formed.

As shown in FIGS. 4A and 4B, a plurality of track widths $T_W$ are formed by a pitch P and preliminary regulation grooves 36 are formed in one of a pair of magnetic cores (in this case, a magnetic core $12_2$) comprising, e.g., ferrite. A winding groove 28' and a bonding groove 38 are formed in the other magnetic core $14_2$ in a direction perpendicular to the preliminary regulation grooves 36.

As shown in FIG. 4C, a metal magnetic layer $20_2$ ($22_2$) consisting of, e.g., Sendust is formed on the opposing surface of the magnetic core $12_2$ ($14_2$).

As shown in FIG. 4D, a bottom portion is removed continuously from the magnetic core $12_2$ except for a portion formed on the wall surface of the preliminary regulation groove 36, thereby forming a regulation groove 40. In addition to this removing method, the following removing method may be adopted to form the regulation groove 40. That is, a thin mask having a thickness larger than the width of the regulation groove 40 is formed in the groove 40 before the meta magnetic layer $20_2$ is formed, and then the layer $20_2$ is formed. In this method, a step of removing the layer $20_2$ is omitted, i.e., the layer $20_2$ can be formed to have a shape from which the bottom portion of the preliminary regulation groove 36 is removed.

Thereafter, as shown in FIG. 4E, a non-magnetic layer $24_2$ comprising, e.g., $SiO_2$ is formed on the surface of the magnetic core $12_2$ opposing the magnetic core $14_2$.

As shown in FIG. 4F, a metal magnetic layer $22_2$ comprising, e.g., Sendust is formed on the opposing surface of the magnetic core $14_2$. A non-magnetic layer $26_2$ consisting of, e.g., $SiO_2$ is formed by sputtering on the metal magnetic layer $22_2$ except for a portion of the winding groove 28' and the bonding groove 38.

Figure 4G:
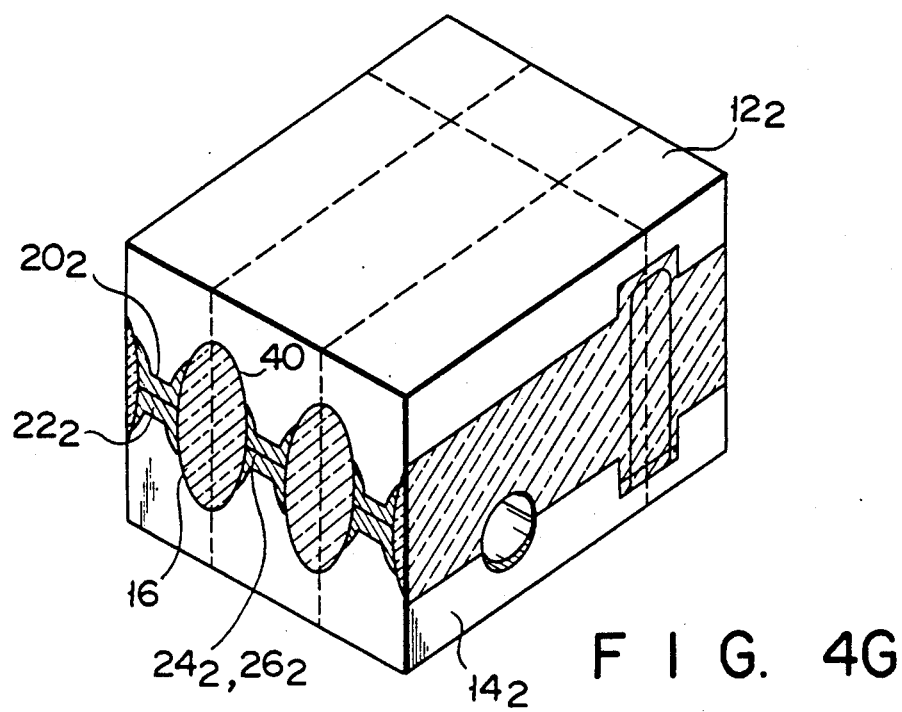
Figure 4H:
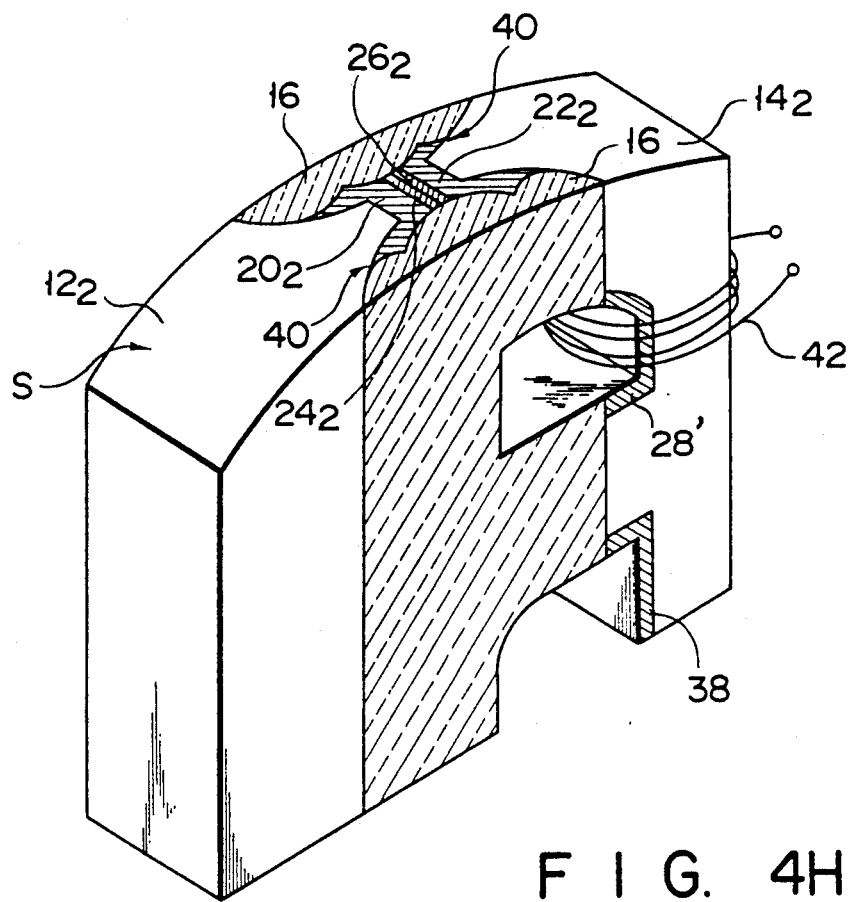

As shown in FIG. 4G, the magnetic cores $12_2$ and $14_2$ are brought into contact with each other so that the non-magnetic layers $24_2$ and $26_2$ are brought into contact with each other. An adhesive 16 is filled in the bonding grooves 38 and the regulation groove 40, and the opposing magnetic cores $12_2$ and $14_2$ are bonded by the adhesive 16. The resultant structure is cut as indicated by broken lines in FIG. 4G, thereby forming a magnetic head as shown in FIG. 4H. In the magnetic head shown in FIG. 4H, a coil 42 is wound around the winding groove 28'.

In the magnetic head formed as described above, the magnetic cores $12_2$ and $14_2$ and the adhesive 16 serving as a bonding portion are directly brought into contact with each other, and the bonding portion is formed to be exposed in the tape sliding surface S. A stress produced by a difference between thermal expansion coefficients of the adhesive (glass) and ferrite can be transmitted to ferrite. Since this predetermined stress can be applied to ferrite, the permeability can be improved.

In each of the above embodiments, a metal magnetic layer and a non-magnetic layer are formed on each of a pair of magnetic cores, and a gap is sandwiched by the metal magnetic layers. The present invention, however, is not limited to the above embodiments. For example, the present invention can be applied to a so-called one-sided MIG head in which a metal magnetic layer $20_3$ is formed at only one side of a gap G as shown in FIG. 5. In this case, a metal magnetic layer $20_3$ and a non-magnetic layer $24_3$ for covering a track width $T_W$ to both the ends thereof are formed in one of a pair of magnetic cores $12_3$ and $14_3$, i.e., the magnetic core $12_3$ by any of the manufacturing methods as described above.

In addition, the present invention can be applied to a composite head having a plurality of gaps $G_1$ and $G_2$ as shown in FIG. 6.

In each of the above embodiments, glass is used as an adhesive. The present invention, however, is not limited to this adhesive. For example, any material other than glass can be used as long as the material has a larger thermal expansion coefficient than that of a magnetic core, homogeneous quality, and a proper weight, and can give a stress to the magnetic core consisting of, e.g., ferrite.

Additional advantages and modifications will readily occur to those skilled in the art. Therefore, the invention in its broader aspects is not limited to the specific details, representative apparatuses, and illustrated examples shown and described. Accordingly, various modifications may be made without departing from the spirit or scope of the general inventive concept as defined by the appended claims and their equivalents.

What is claimed is:

1. A method of manufacturing a magnetic head comprising the steps of:
   sequentially forming a metal magnetic layer and a non-magnetic layer on at least one of a pair of magnetic core means in which predetermined track widths are to be formed on a predetermined pitch;
   removing at least said non-magnetic layer formed outside said track widths while leaving said track widths formed in one of said magnetic core means;
   bonding said magnetic core means such that said track widths of one magnetic core means from which said metal magnetic layer and said non-magnetic layer are removed and the other magnetic core means oppose each other, and forming a gap having said metal magnetic layer at at least one surface thereof; and
   cutting, on a predetermined pitch, said pair of magnetic core means bonded to form said gap therebetween.

2. A method according to claim 1, wherein said track widths are formed so that a width between adjacent track widths is twice to ten times a layer thickness of said metal magnetic layer and said non-magnetic layer.

3. A method according to claim 1, wherein said step of bonding said magnetic core means comprises removing at least said non-magnetic layer and filling and melting an adhesive between adjacent track widths.

4. A method according to claim 3, wherein said adhesive includes glass.

5. A method according to claim 1, wherein said magnetic core means comprises ferrite.

6. A method according to claim 3, wherein at least portions of said pair of magnetic core means are brought into contact with and bonded to said adhesive.

7. A method of manufacturing a magnetic head comprising the processes of:
   forming a plurality of pairs of grooves for regulating track widths in at least one of a pair of magnetic core means;
   sequentially forming a metal magnetic layer and a non-magnetic layer in said magnetic core means in which said plurality of pairs of grooves are formed;
   removing a portion between a pair of adjacent grooves while leaving said track widths of one of said magnetic core means, and forming track widths corresponding to said track widths of said one magnetic core means in the other magnetic core means;
   bonding one magnetic core means from which portions between said plurality of pairs of grooves are removed to the other magnetic core means so that said track widths oppose each other, thereby forming a gap sandwiched between said metal magnetic layers; and
   cutting, on a predetermined pitch, said pair of magnetic core means.

8. A method according to claim 7, wherein said plurality of pairs of grooves are formed so that a width of said grooves becomes twice to ten times a layer thickness of said metal magnetic layer and said non-magnetic layer.

9. A method according to claim 7, wherein said process of bonding said magnetic core means to form said gap comprises filling and melting an adhesive between said track widths.

10. A method according to claim 9, wherein said adhesive includes glass.

11. A method according to claim 7, wherein said magnetic core means comprises ferrite.

12. A method according to claim 9, wherein at least portions of said pair of magnetic core means are brought into contact with and bonded to said adhesive.

13. A method of manufacturing a magnetic head comprising the processes of:

forming a metal magnetic layer on at least one of a pair of magnetic core means in which predetermined track widths are formed on a predetermined pitch;

removing at least said metal magnetic layer formed outside said track widths while leaving said track widths formed in one of said magnetic core means;

forming a non-magnetic layer on said track widths on which said metal magnetic layer is formed;

bonding said magnetic core means such that said track widths of one magnetic core means on which said metal magnetic layer and said non-magnetic layer are formed and the other magnetic core means oppose each other, and forming a gap having said metal magnetic layer at least at one side thereof; and cutting, on a predetermined pitch, said pair of magnetic core means bonded to form said gap therebetween.

14. A method according to claim 13, wherein said track widths are formed so that a width between adjacent track widths becomes twice to ten times a layer thickness of said metal magnetic layer and said non-magnetic layer.

15. A method according to claim 13, wherein said process of bonding said magnetic core means comprises removing at least said metal magnetic layer and filling and melting an adhesive between adjacent track widths.

16. A method according to claim 15, wherein said adhesive includes glass.

17. A method according to claim 13, wherein said magnetic core means comprises ferrite.

18. A method according to claim 15, wherein at least portions of said pair of magnetic core means are brought into contact with and bonded to said adhesive.

* * * * *